US012077925B2

(12) United States Patent
Ramon

(10) Patent No.: US 12,077,925 B2
(45) Date of Patent: Sep. 3, 2024

(54) SKIRTING BOARD ASSEMBLY SUITABLE FOR FITTING ON A FLOOR SURFACE AND SIGNALING SYSTEM FOR SIGNALING AN IMPACT ON A COLLISION PROTECTOR

(71) Applicant: BOPLAN BVBA, Wevelgem (BE)

(72) Inventor: Xavier Ramon, Marke (BE)

(73) Assignee: BOPLAN BVBA, Wevelgem (BE)

( * ) Notice: Subject to any disclaimer, the term of this patent is extended or adjusted under 35 U.S.C. 154(b) by 641 days.

(21) Appl. No.: 17/426,107

(22) PCT Filed: Feb. 19, 2020

(86) PCT No.: PCT/IB2020/051356
§ 371 (c)(1),
(2) Date: Jul. 28, 2021

(87) PCT Pub. No.: WO2020/170137
PCT Pub. Date: Aug. 27, 2020

(65) Prior Publication Data

US 2022/0098808 A1 Mar. 31, 2022

(30) Foreign Application Priority Data

Feb. 19, 2019 (BE) .................................. 2019/5108

(51) Int. Cl.
*E01F 15/14* (2006.01)
*G08B 5/00* (2006.01)

(52) U.S. Cl.
CPC ................ *E01F 15/14* (2013.01); *G08B 5/00* (2013.01)

(58) Field of Classification Search
CPC .................................. E01F 15/14; G08B 5/00
(Continued)

(56) References Cited

U.S. PATENT DOCUMENTS 5,080,523 A 1/1992 Steiner
5,988,934 A 11/1999 Wasserstrom
(Continued)

FOREIGN PATENT DOCUMENTS

KR 20110031555 A 3/2011
WO WO-2007112483 A1 * 10/2007 .............. E04G 5/14
WO 2018163115 A1 9/2018

OTHER PUBLICATIONS

Search report for International Patent Application PCT/IB2020/051356, mailed on Aug. 17, 2020.

*Primary Examiner* — Raymond W Addie
(74) *Attorney, Agent, or Firm* — Fresh IP PLC; Clifford D. Hyra; Aubrey Y. Chen

(57) ABSTRACT

Disclosed is a skirting board assembly including at least two hollow plastic skirting profiles and installation means to install adjacent skirting profiles to each other. The installation means include a first and second connecting element and in which the first connecting element includes an insertion part which is configured to be fitted in an end of a first skirting profile and includes a spherical connecting part, and the second connecting element includes an insertion part which is configured to be fitted in an end of a second adjacent skirting profile and includes a cup-shaped connecting part, so that the second skirting profile is placeable at an angle with respect to the first skirting profile due to the fact that the spherical connecting part of the first connecting element adjoins the cup-shaped connecting part of the second connecting element.

5 Claims, 9 Drawing Sheets

(58) Field of Classification Search
USPC .............................................. 404/6; 256/13.1
See application file for complete search history.

(56) References Cited

U.S. PATENT DOCUMENTS

| | | | |
|---|---|---|---|
| 6,189,868 | B1 | 2/2001 | Santelli |
| 2002/0066897 | A1 | 6/2002 | Meis |
| 2005/0254892 | A1 | 11/2005 | Yodock |
| 2012/0235105 | A1 | 9/2012 | Yasher |
| 2013/0307181 | A1 | 11/2013 | Kulp |

* cited by examiner

3

4

SKIRTING BOARD ASSEMBLY SUITABLE FOR FITTING ON A FLOOR SURFACE AND SIGNALING SYSTEM FOR SIGNALING AN IMPACT ON A COLLISION PROTECTOR

FIELD OF THE DISCLOSURE

The present disclosure relates to a skirting board assembly configured to be fitted onto a floor structure and suitable for delimiting a zone or protecting walls against impact, comprising at least two hollow plastic skirting profiles and installation means to install adjacent skirting profiles to each other, wherein the installation means comprise a first and second connecting element in which the first connecting element comprises an insertion part which is configured to be fitted in an end of a first skirting profile, and wherein the second connecting element comprises an insertion part which is configured to be fitted in an end of a second adjacent skirting profile. The skirting board assembly according to the disclosure is particularly suitable as a floor protection system which offers protection up to ankle height.

BACKGROUND

In industrial environments, such as warehouses and logistic centres, forklift trucks are often used to handle goods. In order to delimit pedestrian areas, protect racks, machines, walls or other construction elements against a collision or crash with forklift trucks or other traffic, it is known to install elongate skirting profiles on the floor surface as a so-called collision protection device or collision protection. The known skirting profiles are made from materials such as metal, plastic or from a combination of both. They are produced in standard lengths, sawn to size and subsequently attached to a floor structure by means of anchoring means, preferably concrete screws (concrete anchors). To this end, passages for the concrete screws are drilled into the skirting profile sawn to site.

The existing skirting profiles are ideal for fitting along straight sections across great lengths. However, in situations where there are many corners and bends, for example when the contour of a machine has to be delimited, the existing skirting profiles are far less suitable, because this requires the use of short skirting profiles which are sawn to size and are placed next to each other. Furthermore, gaps always remain between the skirting profiles placed next to each other. In addition, bores for the concrete screws are always made in the skirting profiles in order to fasten them, thus rendering them unsuitable for use in a different environment. Furthermore, the bores in the skirting profile may lead to contamination of the internal space of the skirting profile.

U.S. Pat. No. 6,189,868 describes a device which is fittable on the floor for stopping a wheel device, in particular a baby walker, which is constructed from a number of interconnectable hollow plastic profiles. In order to connect two plastic profiles to each other at an angle, U.S. Pat. No. 6,189,868 inter alia describes a connecting element having a first and second arm which are positioned at a well-defined angle with respect to each other. The respective arms are dimensioned such that they can be inserted into a first and second adjacent plastic profile. The angle defined between the two arms may vary between 90 and 120 degrees. Friction between the arms and the plastic profiles results in a good connection of the arm with the plastic profile and prevents its inadvertent withdrawal. However, such a device has the drawback that it requires quite a bit of work to install and subsequently uninstall it.

SUMMARY

It is therefore an object of the present disclosure to provide a skirting board assembly by means of which a continuous delimitation can easily be produced which, in addition, can easily be uninstalled and/or repositioned and whose skirting profiles remain re-usable.

The object of the disclosure is achieved by providing a skirting board assembly configured to be fitted onto a floor structure and suitable for delimiting a zone or protecting walls against impact, comprising at least two hollow plastic skirting profiles and installation means to install adjacent skirting profiles to each other, wherein the installation means comprise a first and second connecting element in which the first connecting element comprises an insertion part which is configured to be fitted in an end of a first skirting profile, and wherein the second connecting element comprises an insertion part which is configured to be fitted in an end of a second adjacent skirting profile, in which the first connecting element furthermore comprises a connecting part with a convex end, and wherein the second connecting element comprises a connecting part with a concave end, in which the convex end of the first connecting element is configured in a corresponding manner to the concave end of the second connecting element, so that the second skirting profile is placeable at an angle with respect to the first skirting profile due to the fact that the first connecting element which is provided in the one skirting profile adjoins, with its convex end, the concave end of the second connecting element which is provided in the adjacent skirting profile.

The skirting profiles according to the disclosure have a length starting from less than a metre to profiles of several metres in length. Due to the fact that, after they have been sawn to site, they are connected to a connecting element via their (head) end, the head ends of the skirting profile are also protected. The insertion parts of the connecting elements are dimensioned such that they can be slid into and out of the skirting profiles easily and without friction.

Due to the presence of (complementary) connecting elements which fit into (onto)/(touch) each other, configured as insertion parts with a convex (spherical) or concave (hollow) end part, a skirting profile is perfectly orientable with respect to an adjacent skirting profile. As a result thereof, the user of the skirting board system can place the one skirting profile at the desired angle with respect to the adjacent skirting profile. By means of such a system, angles can readily be formed and a continuous delimitation can be achieved in a simple manner. In this way, a well-defined contour can be followed perfectly.

After the skirting profiles have been oriented with respect to each other, they have to be fixed to the floor structure situated underneath. In a preferred embodiment according to the disclosure, the first and second connecting elements of the skirting board assembly are to this end provided with an anchoring opening which is suitable for accommodating an anchoring means by means of which the connecting element is attachable to a floor structure. Due to the fact the skirting board assembly is connected via the connecting elements, the skirting profiles do not have to be damaged in order to fix (anchor) the assembly to a floor structure. The anchoring means is preferably a screw, more particularly a concrete screw. Obviously, the connecting element may also be attached to a floor structure via another suitable anchoring means, for example a bolt. Preferably, the first and second connecting elements are provided with a passage opening via which the internal space of the connecting element is accessible, in order thus to reach an anchoring means which has been placed in said anchoring opening. The above-described anchoring opening, anchoring means and passage means also form part of the installation means.

In a more preferred embodiment of the skirting board assembly according to the disclosure, the installation means furthermore comprise a coupling element suitable for coupling two skirting profiles to each other, wherein the coupling element comprises two insertion parts which are in line with one another, and wherein the first insertion part is configured to be fitted in an end of the one skirting profile and the second insertion part is configured to be fitted in an end of the other skirting profile.

In a particular embodiment of the skirting board assembly according to the disclosure, the installation means furthermore comprise a corner element suitable for coupling two skirting profiles at right angles to each other, wherein the corner element comprises two insertion parts which extend at right angles to each other, wherein the first insertion part is configured to be fitted in in an end of the one skirting profile and the second insertion part is configured to be fitted in an end of the other skirting profile.

The insertion parts of the coupling element and of the corner element are configured in a similar way as those of the two connecting elements. Also, the coupling element and the corner element are provided with the necessary means, in particular an anchoring opening and a passage opening via which this anchoring opening is accessible, in order also to attach the coupling element and the corner element to a floor structure situated underneath by means of anchoring means.

The above-described first and second fastening element, coupling element and corner element may be regarded as an installation element which can be fitted to the end of a skirting profile.

The respective skirting board assembly is designed to be able to withstand a certain maximum impact (collision) energy. Below this energy level, the system reacts in an elastic manner, as a result of which it returns to its original shape. Above this energy level, a (plastic) deformation will occur. The parts of the assembly which are subjected to a load in the plastic range will not break or crack immediately, but will lose their initial strength. However, this is not always be visually apparent, due to the fact that plastic deformation of a polymer may also occur internally and without any visible damage on the outside. This may lead to dangerous situations when a damaged skirting board assembly suffers an additional collision. Even if an impact remains below the maximum energetic value for which it was designed, the damaged skirting profile may break then.

A typical example from the industry are reckless forklift drivers who cause serious collisions and do not always report these to their superiors when there is no visible damage. However, they do not realise that the skirting profiles have (often) suffered serious damage as a result of the collision, which may lead to severe risks to bystanders or to the elements to be protected in case of a subsequent collision.

In order to be able to signal damage, the present disclosure, in a particular embodiment of the skirting board assembly, comprises a signalling element suitable for signalling an impact, wherein said signalling element is provided with a securing part in order to be secured to an insertion part of an installation element, such as a connecting element, coupling element or corner element, which is configured to be fitted in an end of a skirting profile and comprises a foldable part of a predetermined length, wherein the signalling element is configured to fold open when the distance between the installation element and the skirting profile becomes greater than the predetermined length due to a displacement of the skirting profile over the insertion part. In case of a collision with the skirting profile, the latter will bend as a result of the impact and a gap will form during bending at the location of the connection to the installation element provided on the end. Due to the elasticity of the material of the skirting profile, the skirting profile returns to its original shape, as a result of which the gap also disappears and there is no longer any visible sign of an impact on the respective skirting profile. If the insertion part of an installation element is provided with a signalling element, this foldable part will fold open upon impact and if the resulting gap is sufficiently wide, i.e. wider than the length of the foldable part, and thus serves as a sign that a critical impact has taken place, even if the skirting profile has returned to its original shape and there is no longer a gap between the end of the skirting profile and the connection to the installation element. In an alternative embodiment, the signalling element may also be provided at the location of the end of the skirting profile, in this case, however, the end has to be of a tapering design, so that it can be pushed into the installation element.

Preferably, the signalling element comprises a spring-loaded element suitable for moving the foldable part from a rest position to an unfolded position, wherein the foldable part, in the rest position, bears against a wall of the skirting profile.

Such a way of signalling is obviously also perfectly suitable for use with other types of collision protection means, such as e.g. an enclosure or rack protector. To this end, another subject-matter of the present disclosure is also a signalling system for signalling an impact on a collision protection means, comprising at least two hollow enclosure posts between which at least one hollow cross member extends, wherein the enclosure posts each comprise a tubular coupling part across which a part of the cross member is slidable in order to couple the cross member to the enclosure post, wherein the signalling system comprises a signalling element, wherein said signalling element is provided with a securing part in order to be secured to the coupling part and comprises a foldable part of a predetermined length, wherein the signalling element is configured to fold open when the distance between the cross member and the enclosure post becomes greater than the predetermined length due to the cross member being displaced with respect to the enclosure post. The displacement is preferably the result of an impact on the cross member.

The outer diameter of the coupling part is smaller than the inner diameter of the cross member. As a result thereof, the cross member can be pushed over the coupling part without friction. The signalling element is provided in the space between the outer sleeve of the coupling part of the enclosure post and the inner sleeve of the cross member. Preferably, the axis of the tubular coupling part extends at right angles to the longitudinal axis of the enclosure post, as enclosure posts are in a vertical position during normal use, the coupling parts will extend horizontally, just like the cross members.

The securing part is preferably provided with a layer of adhesive in order to thus attach the signalling element. The layer of adhesive may be covered by a removable protective layer. In a preferred embodiment, the signalling element comprises a spring-loaded element suitable for moving the foldable part from a rest position to an unfolded position, wherein, in the rest position, the foldable part bears at least partly against a wall, preferably an inner wall, of the cross member.

A collision protection means comprising at least two hollow enclosure posts between which at least one hollow cross member extends, wherein the enclosure posts each comprise a tubular coupling part as described above over which a part of the cross member is displaceable in order to couple the cross member with the enclosure post, and which is provided with the above-described signalling element suitable in order to signal an impact on the respective collision protection means, also forms part of this patent description.

BRIEF DESCRIPTION OF THE DRAWINGS

The present disclosure will now be explained in more detail by means of the following description of a preferred embodiment of a skirting board assembly and signalling system according to the present disclosure. The sole aim of this description is to give illustrative examples and to indicate further advantages and particulars of this enclosure, and can therefore not be interpreted as a limitation of the area of application of the disclosure or of the patent rights defined in the claims.

In this description, reference numerals are used to refer to the attached drawings, in which.

DETAILED DESCRIPTION

The skirting board assembly (1) according to the present disclosure was developed to be fitted to a floor structure and preferably offers protection up to ankle height. The skirting board assembly (1) may be used as collision protection by means of which a well-defined zone or device can be delimited, a lane for forklift trucks can be formed or impact-sensitive walls, e.g. walls made from sandwich panels in e.g. cold stores, or decorative walls can be protected.

Figure 3:
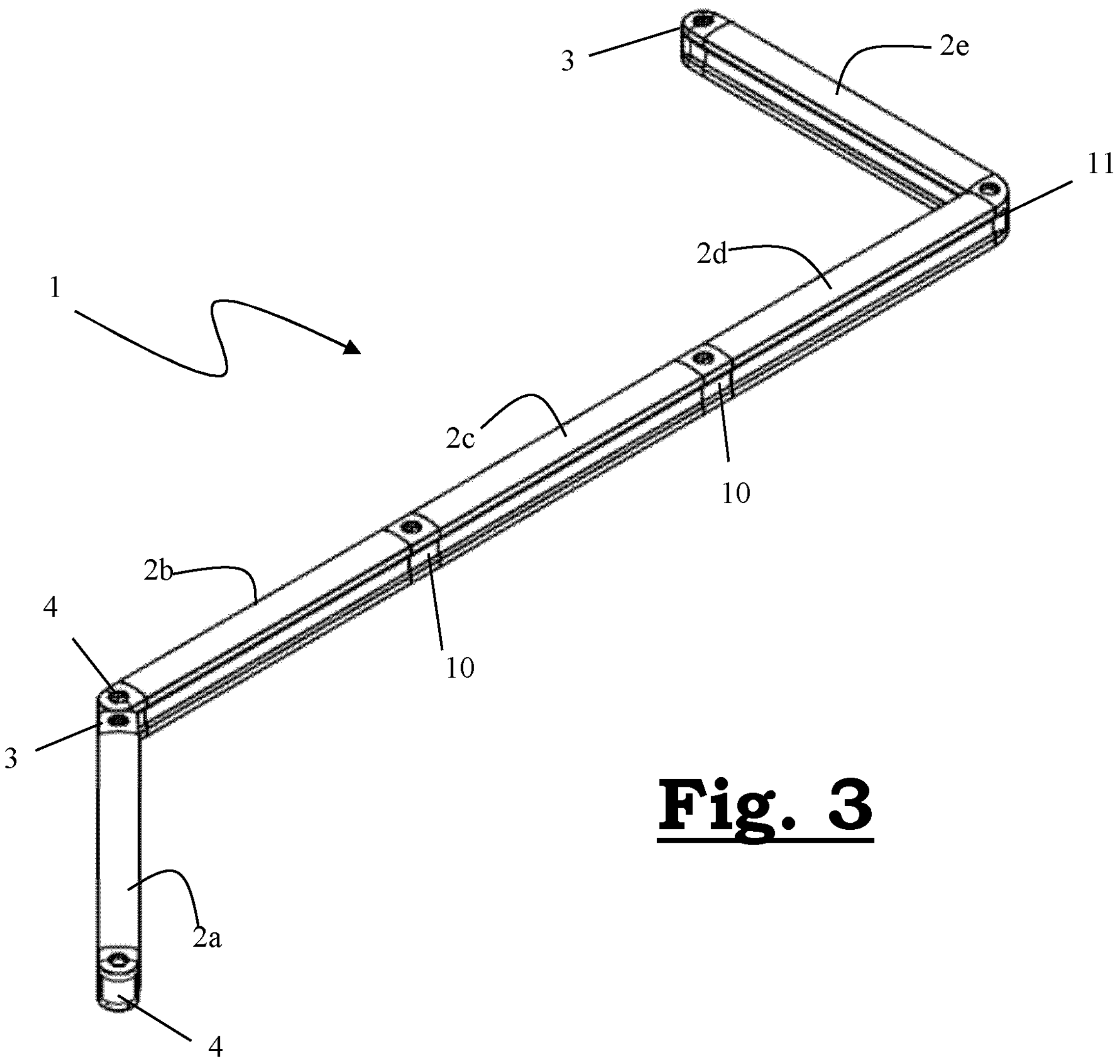
FIG. 3: shows a perspective view of an uninterrupted skirting board assembly formed from skirting profiles which are connected to each other by means of installation elements.

As illustrated in FIG. 3, the skirting board assembly (1) comprises a number of hollow skirting profiles (2*a*;2*b*;2*c*;2*d*;2*e*) which are made from plastic by means of extrusion or injection-moulding. Suitable plastic materials for the skirting profiles are: polyolefins based on polypropylene, polyethylene or the like. To this end, the skirting profiles (2*a*;2*b*;2*c*;2*d*;2*e*) can be placed against each other and be kept in position by means of installation means provided for the purpose.

The skirting profiles (2*a*;2*b*;2*c*;2*d*;2*e*) are of simple design, usually they have an I-shaped cross section. However, they may also be rectangular, square or tubular and have, if tubular, a circular cross section. The skirting profiles have a length between less than one metre and a few metres and have a height which varies from 100 mm to 500 mm.

Figure 1:
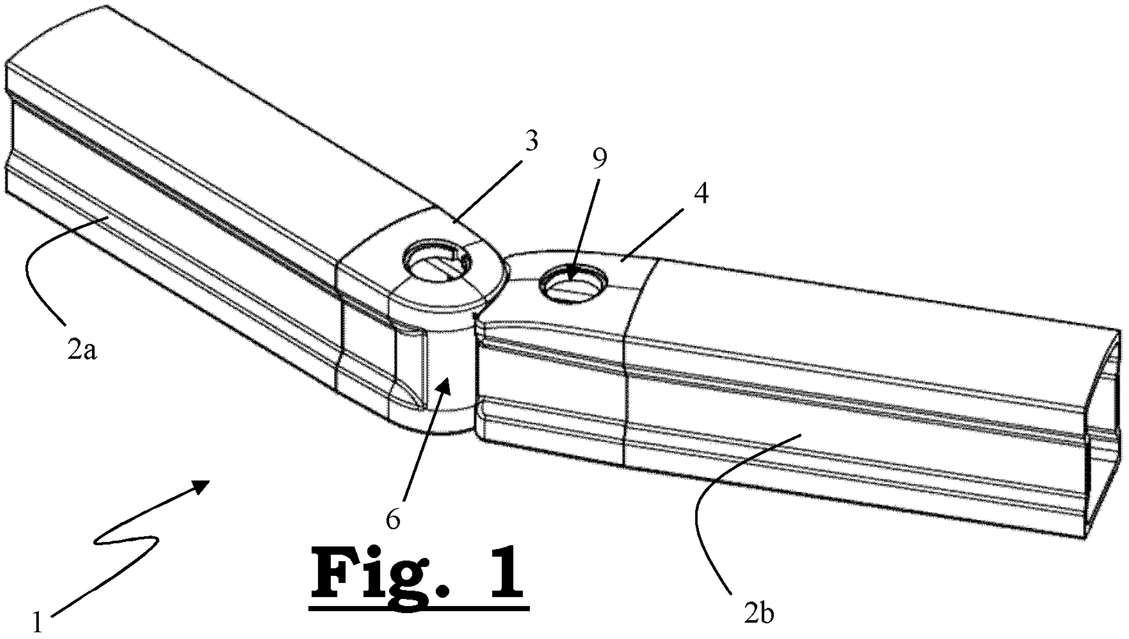
FIG. 1: shows a perspective view of two skirting profiles which bear against each other at an angle with respect to each other.
Figure 2:
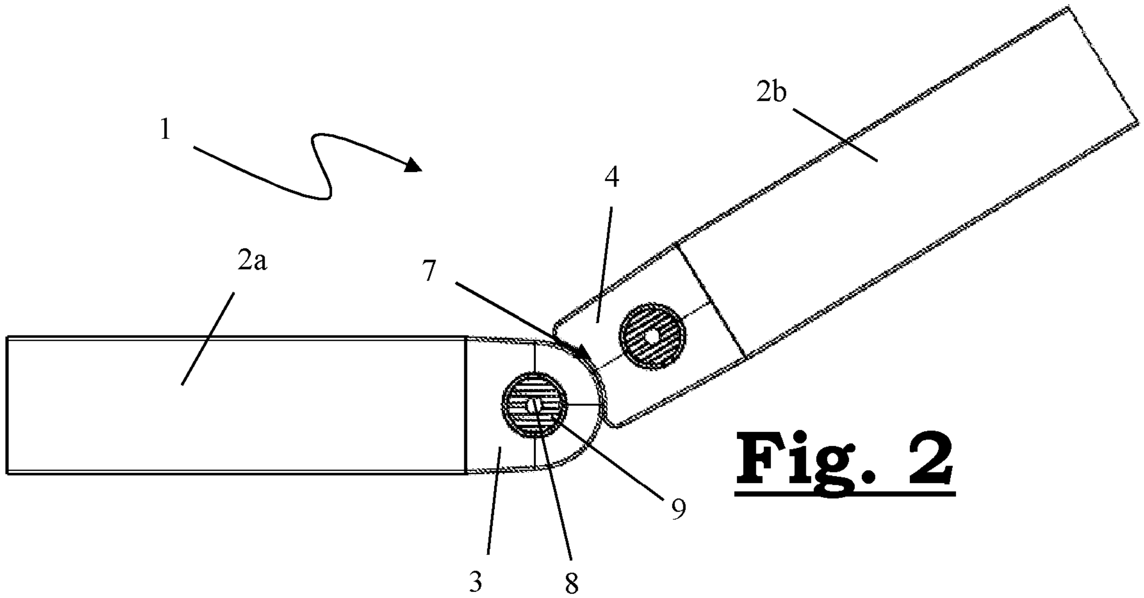
FIG. 2: shows a top view of the figure shown in FIG. 1.

The skirting board assembly (1) was developed in particular for use in environments comprising many bends, in which it is easy to orient the skirting profiles with respect to each other, so that an uninterrupted unit, can be formed (see FIG. 3). In order to orient the various skirting profiles (2*a*;2*b*;2*c*;2*d*;2*e*) with respect to each other in an easy way, the installation means comprise a first (3) and second fastening element (4) having a specific embodiment, as shown inter ilia in FIGS. 4 to 7, which allows adjacent skirting profiles to be connected to each other in an aesthetically pleasing manner, with the end faces of the respective fastening elements (3,4) being in contact with each other (see e.g. FIGS. 1 and 2), so that it is easier to follow a well-defined contour. Each connecting element (3;4) comprises an insertion part (5) which is configured to be fitted in an end of the skirting profile. The connecting element (3;4) is fitted in the skirting profile by pushing its insertion part (5) into it, to this end, the dimensions of the insertion part (5) are slightly narrower than the inner dimension of the skirting profile. Furthermore, the insertion part (5) is dimensioned such that the skirting profile is still displaceable over the respective insertion part.

Figure 4:
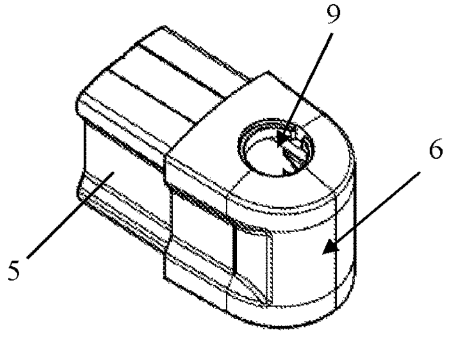
FIG. 4: shows a perspective view of a first connecting element of the skirting board assembly according to the disclosure.
Figure 5:
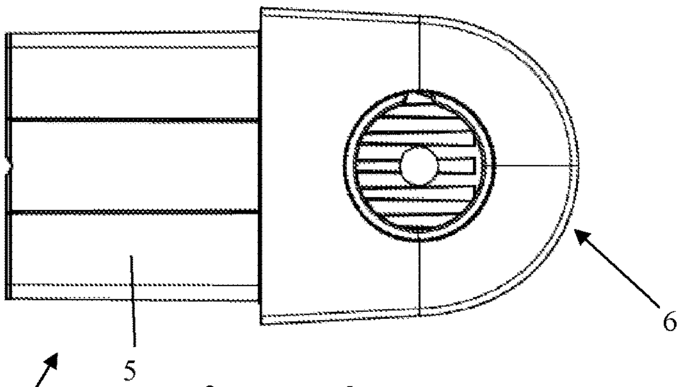
FIG. 5: shows a top view of the first connecting element illustrated in FIG. 4.
Figure 6:
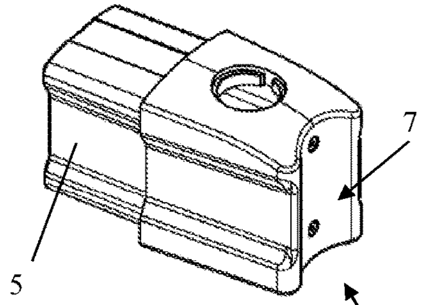
FIG. 6: shows a perspective view of a second connecting element of the skirting board assembly according to the disclosure.
Figure 7:
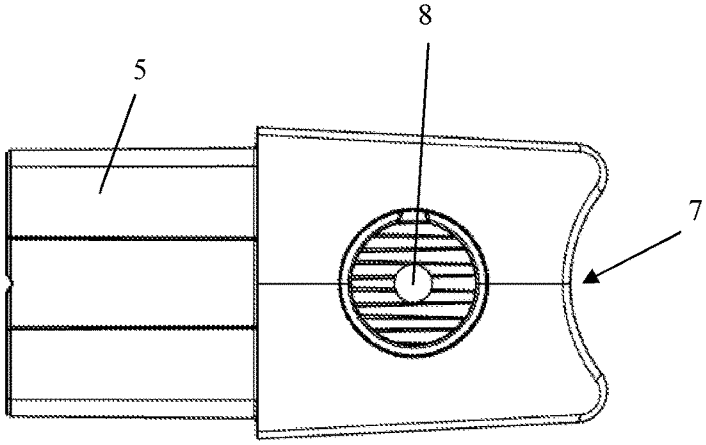
FIG. 7: shows a top view of the second connecting element illustrated in FIG. 6.

As can be seen from FIGS. 4 and 5, the first connecting element (3) comprises a spherical (convex) connecting part (6) and the second connecting element (4) comprises a cup-shaped (concave) connecting part (7). Due to the fact that the spherical end of the first connecting element (3) which is provided in the one skirting profile (2*a*) adjoins the cup-shaped end of the second connecting element (4) which is provided in the adjacent skirting profile (2*b*), it is very easily possible to position adjacent profiles at a freely selected angle with respect to each other. Two adjacent skirting profiles can be placed at an angle (working angle) with respect to each other which varies between +45° and −45° with respect to the centre line of the skirting profile in which the second connecting element (4) is fitted.

The fastening elements (3;4) are likewise hollow and are preferably made from plastic material, preferably from a plastic material having a greater impact resistance than that from which the skirting profiles are made.

Figure 8:
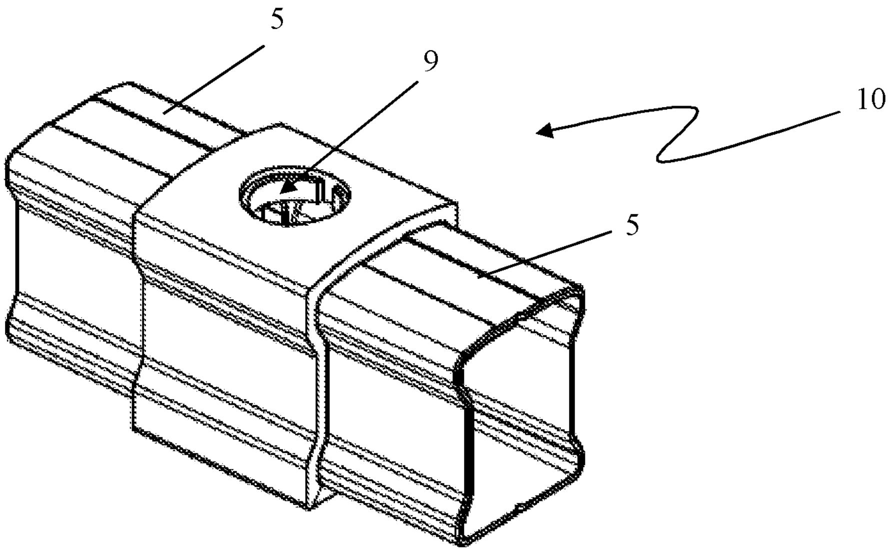
FIG. 8: shows a perspective view of a coupling element of the skirting board assembly according to the disclosure.
Figure 9:
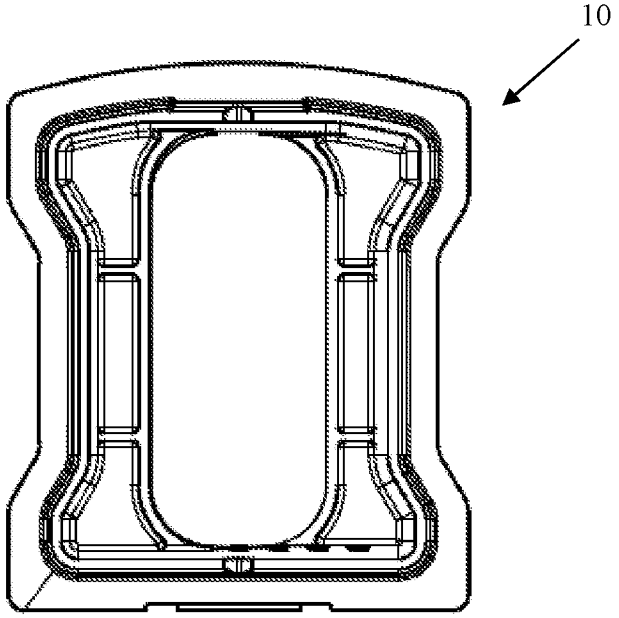
FIG. 9: shows a cross section of the coupling element illustrated in FIG. 8.

The installation means of the skirting board assembly furthermore comprise a coupling element (10) which is suitable for coupling two skirting profiles to each other along a straight line. As is shown in FIG. 8, the respective coupling element to this end comprises two insertion parts (5) which are in line with one another, wherein the first insertion part is configured to be fitted in an end of the one skirting profile and the second insertion part is configured to be fitted in an end of the other skirting profile. The two insertion parts (5) are of a similar design and have the same function as described for the first and second fastening element.

Figure 10:
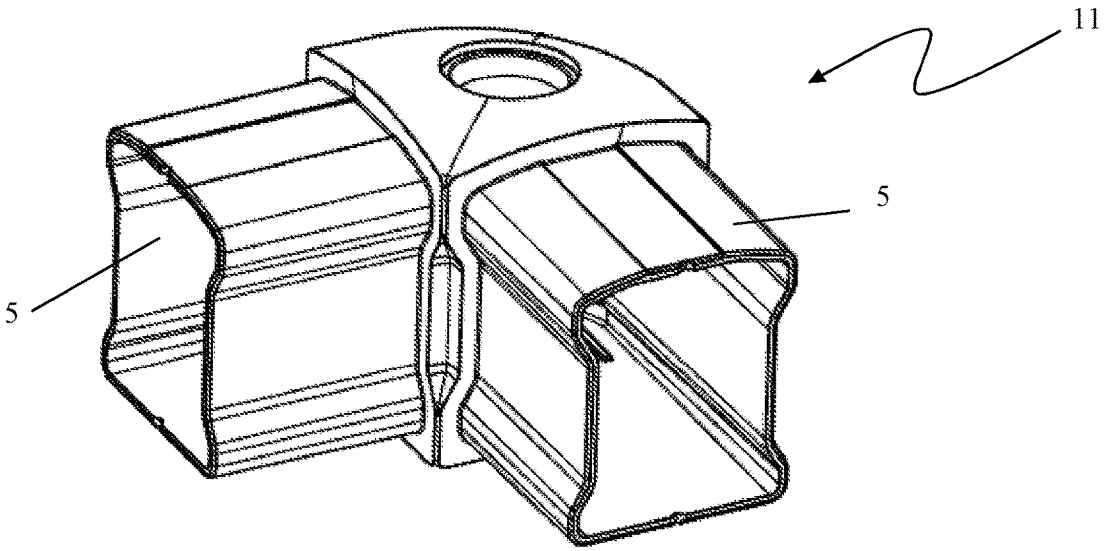
FIG. 10: shows a perspective view of a corner element of the skirting board assembly according to the disclosure.

In order to connect two skirting profiles (2*d*; 2*e*) at an angle of 90° with each other, the installation means of the skirting board assembly (1) according to the disclosure also comprise a corner element (11) which is suitable for coupling two skirting profiles at right angles to each other. As is shown in FIG. 10, the corner element in this case comprises two insertion parts (5) which extend at right angles to each other, with the first insertion part being configured to be fitted in an end of the one skirting profile and the second insertion part being configured to be fitted in an end of the other skirting profile. Again, these insertion parts are of a similar design and have the same function as described for the first and second fastening element.

After the skirting profiles have been oriented with respect to each other by means of the above-described fastening elements (3;4) and/or coupling elements (10) and/or corner elements (11), they have to be fixed to the floor structure situated underneath. To this end, the various installation elements (3;4;10;11), in particular the first (3) and second (4) connecting element, the coupling element (10) and the corner element (11), of the skirting board assembly (1) are provided with an anchoring opening (8) which is suitable for accommodating an anchoring means, such as e.g. a concrete screw or concrete anchor, by means of which the respective installation element can be fastened to a floor structure. Due to the fact that attaching the skirting board assembly, in particular the skirting profiles, to a floor surface situated underneath is effected indirectly via the installation elements, the skirting profiles themselves must not be damaged (drilled through) in order to fix the assembly to a floor structure. In this way, these skirting profiles are re-usable, if necessary, for example in another configuration.

In order to be readily able to access the screw or another suitable anchoring means during installation, the various said installation pieces are provided with a passage opening (9) via which the anchoring opening is accessible by means of a tool, such as for example a screwdriver, in order thus to fix the respective installation piece onto a floor structure. The respective passage opening (9) may be left open or may be covered by means of a suitable cover piece.

Figure 14:
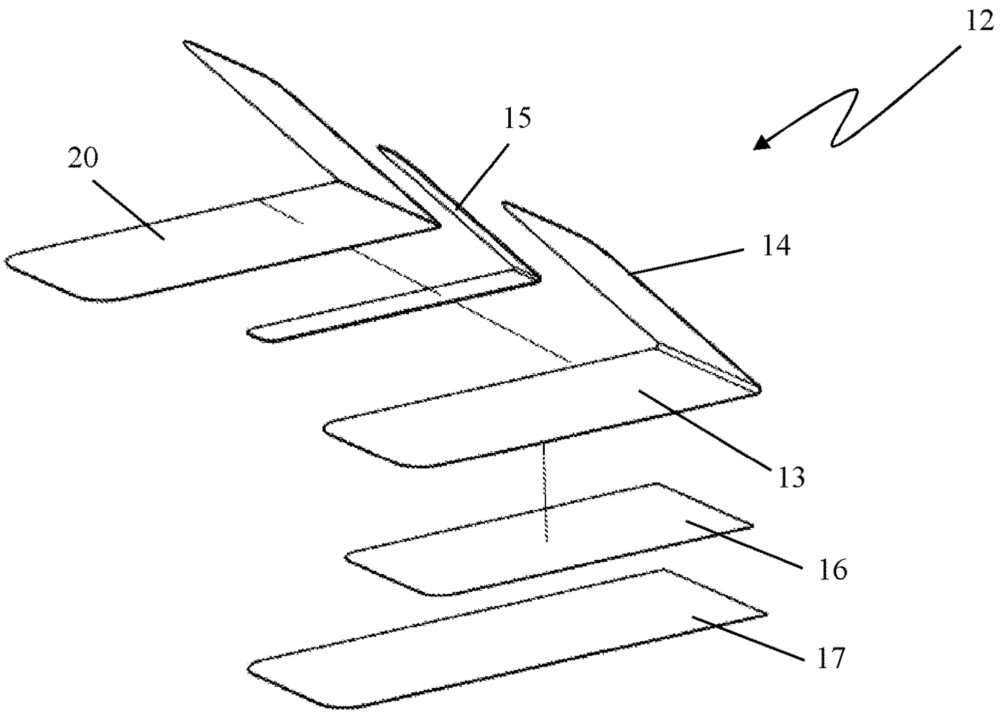
FIG. 14: shows an exploded view of a possible embodiment of a signalling element.
Figure 15:
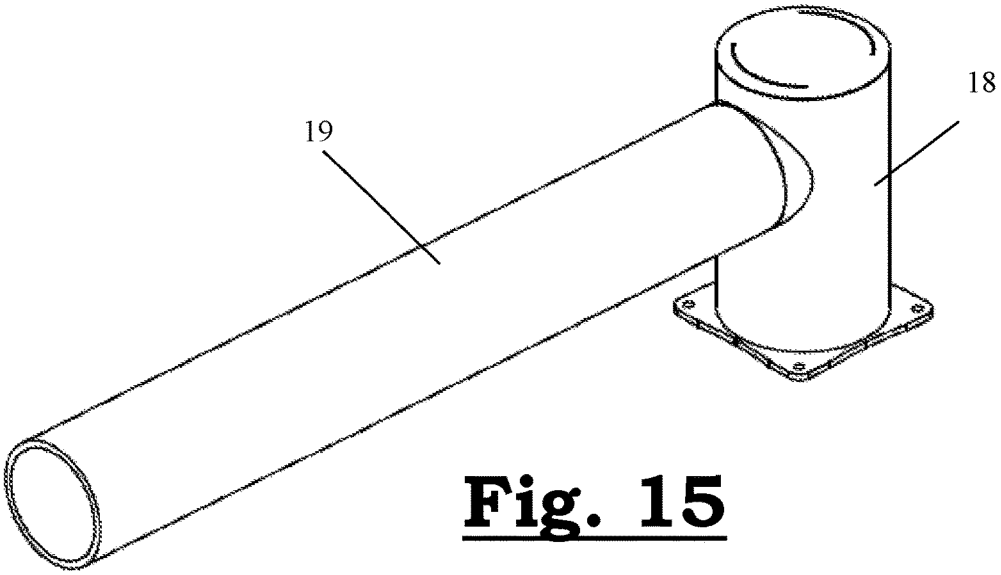
FIG. 15: shows a hollow enclosure post which forms part of a collision protection means, and to which a cross member is coupled and in which a signalling element is provided between the cross member and a part of the enclosure post.
Figure 16:
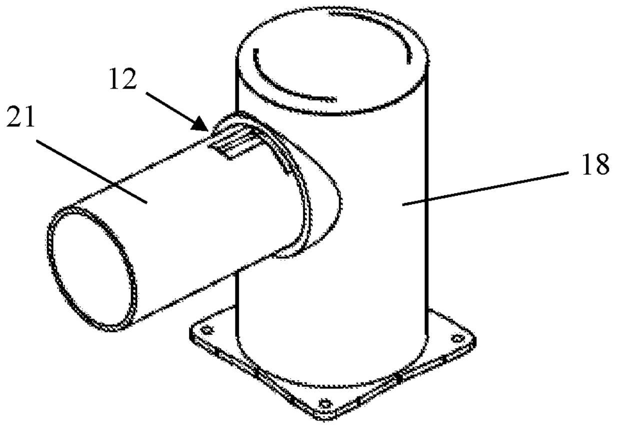
FIG. 16: shows a view of the enclosure post illustrated in FIG. 15 without the cross member, so that the means by which the signalling element is attached to the coupling part of the enclosure post is visible.
Figure 17:
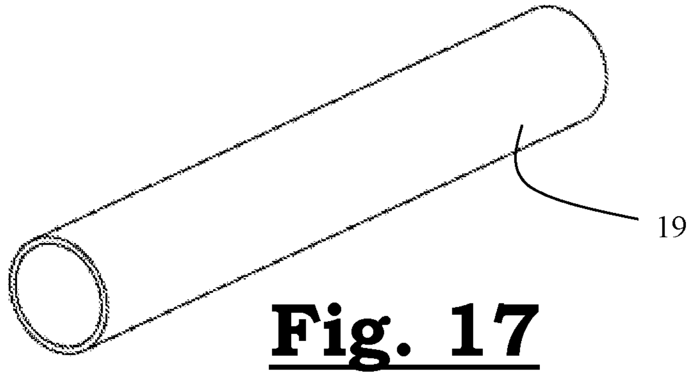
FIG. 17: shows a perspective view of a cross member which forms part of a collision protection means.

In order to be able to signal damage, the skirting board assembly (1) comprises a signalling element (12) suitable for signalling an impact. This signalling element (12) comprises, on the one hand, a securing part (13) which is configured to be secured to an insertion part (5) of an installation element, such as e.g. a connecting element (3;4), coupling element (10) or corner element (11), wherein the insertion part (5) is configured to be fitted in an end of a skirting profile and the signalling element (12) on the other hand comprises a foldable part (14) of a predetermined length, wherein the signalling element (12) is configured to fold open when the distance between the installation element and the skirting profile is greater than the predetermined length. There are various way to cause the foldable part to fold open, thus, as shown for example in FIG. 14, it may be provided with a spring-loaded element (15) which is suitable for moving the foldable part (14) from a rest position to an unfolded position, wherein the foldable part, in the rest position, bears against a wall of the skirting profile. In the illustrated embodiment, the foldable part (14) is connected to the securing part (13) via a folding line. In order to secure the signalling element (12), the securing part (13) is provided with a layer of adhesive (16). The layer of adhesive is covered by a removable protective layer (film) (17) which has to be removed before the signalling element (12) is fitted. The signalling element (12) may furthermore also comprise a cover element (20) to reinforce the unit. The form of the cover element (20) is similar to the combination of securing part (13) and foldable part (14).

Figure 11:
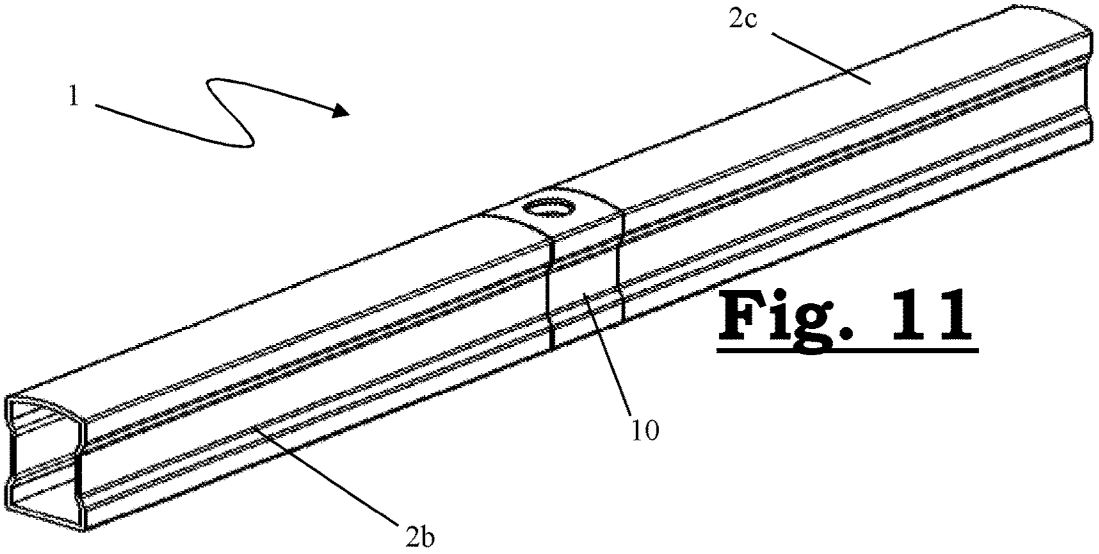
FIG. 11: shows a skirting hoard assembly of two skirting profiles which are connected to each other via a coupling element and in which the insertion part of the coupling element is provided with a signalling element.
Figure 12:
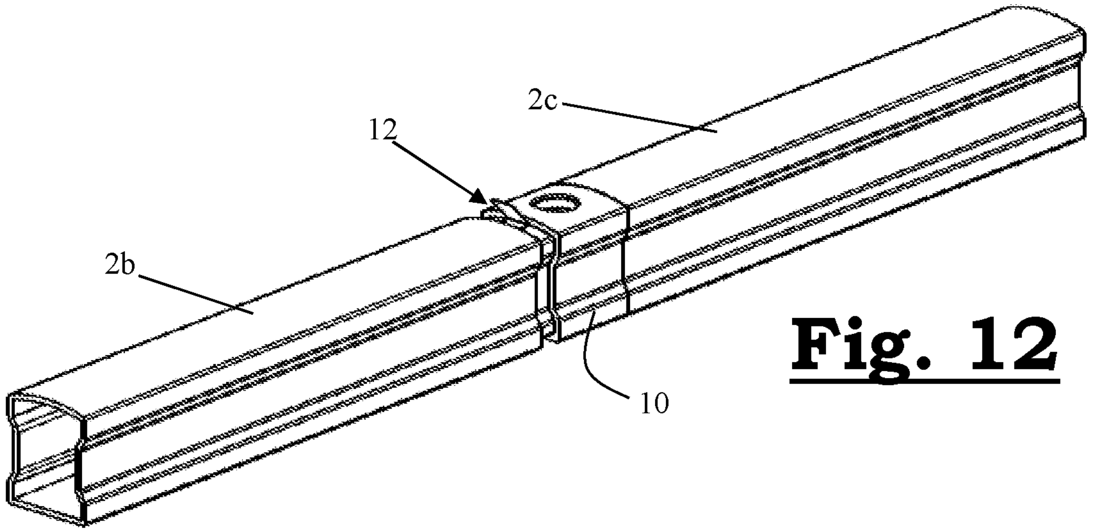
FIG. 12: shows a view of the skirting board assembly illustrated in FIG. 11 during a sufficiently great impact.
Figure 13:
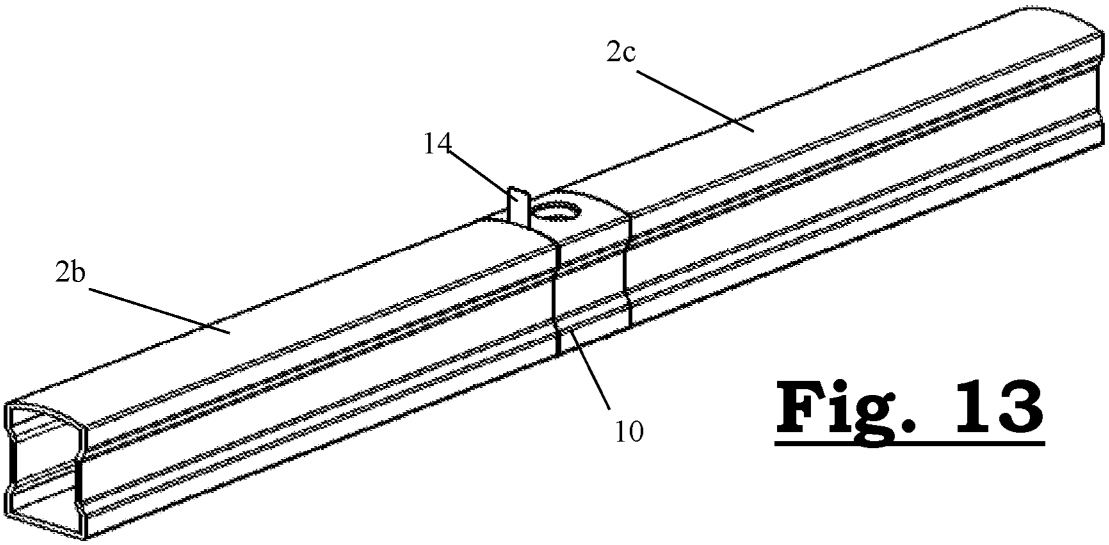
FIG. 13: shows a view of the skirting board assembly illustrated in FIG. 11 after the impact.

In case there is a collision with the skirting profile, as e.g. illustrated in FIG. 11, the latter will bend due to the impact, and a gap will form during this bend (See FIG. 12) at the location of the connection to the installation element provided on the end. Due to the elasticity of the material of the skirting profile, the skirting profile returns to its original shape (see FIG. 13), as a result of which the gap also disappears and it is thus no longer possible to see that the respective skirting profile has suffered an impact. When the insertion part of an installation element is provided with a signalling element (12), the foldable part will fold open upon impact and if the formed gap is sufficiently wide, i.e. wider than the length of the foldable part (see FIG. 12), so that it serves as a sign that a critical impact has occurred. Even if the skirting profile returns to its original shape and there is no longer any gap between the end of the skirting profile and the connection to the installation element, the fact that an impact occurred remains visible due to the unfolded position of the foldable part (14), as is illustrated in FIG. 13. In an alternative embodiment, the signalling element (12) may also be provided at the location of the end of the skirting profile, however in this case the end has to be of a tapering design, so that it can be pushed into the installation element.

Figure 18:
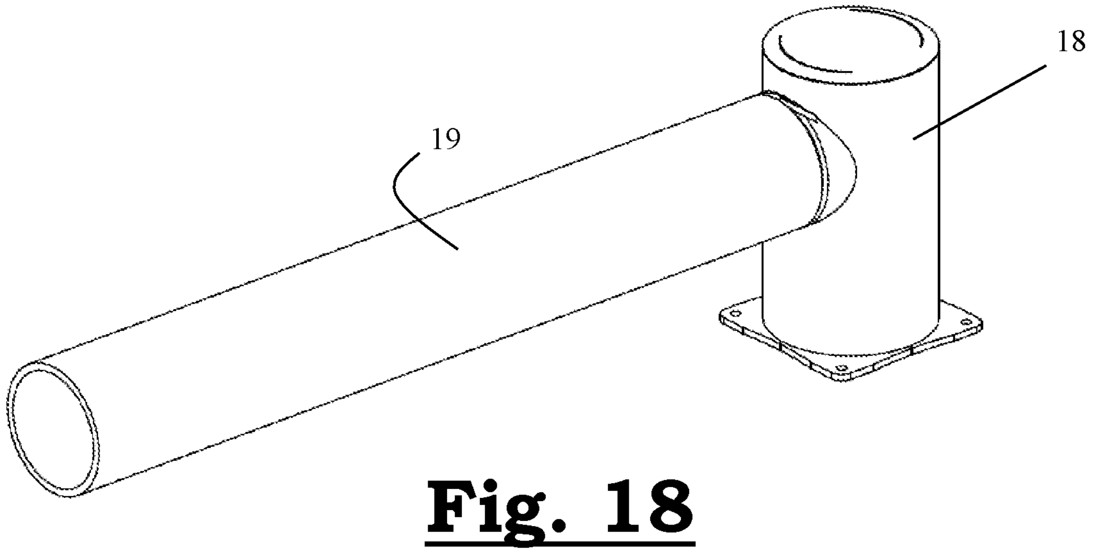
FIG. 18: shows a view the enclosure post illustrated in FIG. 15 during a sufficiently great impact which results in a gap being formed between the end of the cross member and a part of the enclosure post.
Figure 19:
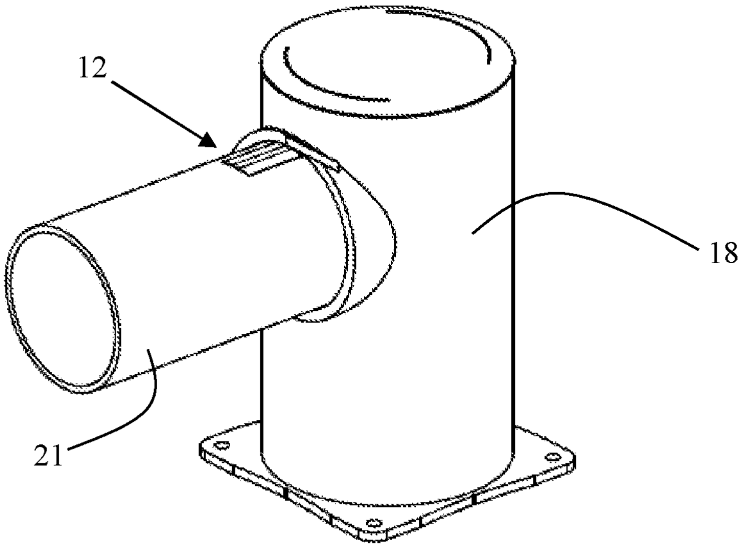
FIG. 19: shows a view of the enclosure post illustrated in FIG. 18 in which the cross member has been removed and in which it is clearly visible that the signalling element was activated, so that the foldable part is folded open.
Figure 20:
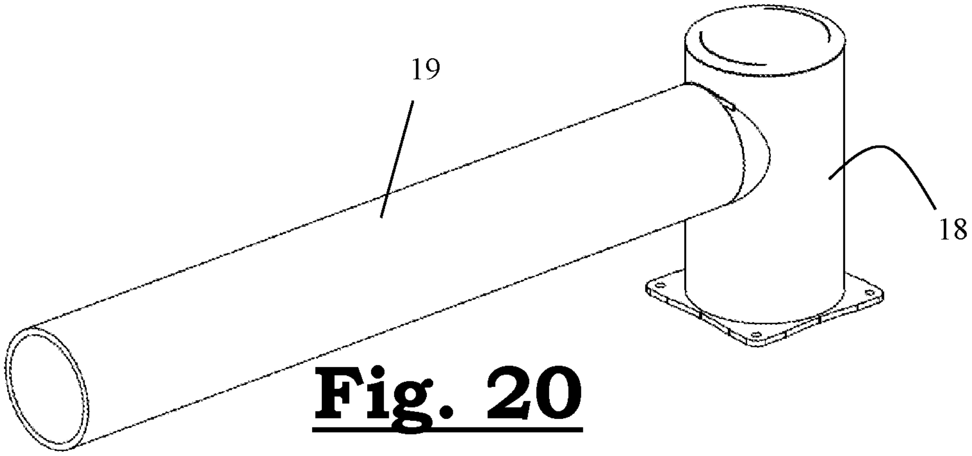
FIG. 20: shows a view of the enclosure post illustrated in FIG. 15 after a sufficiently great impact which resulted in the signalling element being activated, so that the foldable part was folded open, and in which the cross member has returned to its original position, so that the gap which formed during the impact has disappeared.

Such a way of signalling is obviously also perfectly suitable for use with other collision protection means such as, e.g., an enclosure or rack protector. Such a signalling system for signalling an impact on a collision protection means and the operation thereof is shown in FIGS. 15 to 20. The signalling system comprises at least two hollow enclosure posts (18) between which at least one hollow cross member (19) extends, wherein the enclosure posts (18) each comprise a tubular coupling part (21) over which a part of the cross member (19) is displaceable in order to couple the cross member to the enclosure post, and wherein the signalling system furthermore comprises a signalling element (12), wherein said signalling element (12) is provided with a securing part (13) in order to be secured to the coupling part (21) which forms part of the enclosure post and comprises a foldable part of a predetermined length, wherein the signalling element (12) is configured to fold open when the distance between the cross member, in particular the end thereof, and the enclosure post has become greater than the predetermined length, preferably due to an impact to the cross member. The securing part is preferably provided with a layer of adhesive in order thus to secure the signalling element to the coupling part (21). The layer of adhesive may be covered by a removable protective layer. In a preferred embodiment, the signalling element comprises a spring-loaded element suitable for moving the foldable part from a rest position to an unfolded position, wherein the foldable part, in the rest position, at least partly bears against the inner wall of the cross member (19). FIG. 18 shows an enclosure post (18) with a cross member (19) during an impact, with the cross member being bent as a result of the impact and a space (gap) having been created between the end of the cross member (19) and a part of the enclosure post (18) which is sufficiently large to allow the foldable part to fold open. After the impact, the cross member (19) assumed its original position, as shown in FIG. 20, in particular that in which the end of the cross member (19) adjoins (bears against) the enclosure post, so that the gap formed due to the impact has disappeared and it is no longer immediately visible that there has been an impact. Only the folded part of the signalling element (12) indicates that there has been an impact, so that a check can be carried out and the respective cross member may be replaced, if necessary.

The invention claimed is:

1. A collision protector comprising:

at least two hollow enclosure posts between which at least one hollow cross member extends, wherein each of the at least two hollow enclosure posts comprises a tubular coupling part across which a part of the at least one hollow cross member is slidable in order to couple the at least one hollow cross member to the respective enclosure post, and a signalling element, wherein the signalling element (i) is provided with a securing part in order to be secured to the coupling part of one of the at least two hollow enclosure posts, and (ii) comprises a foldable part of a predetermined length, wherein the signalling element is configured to fold open when a distance between the one hollow enclosure post and the at least one hollow cross member becomes greater than the predetermined length due to the at least one hollow cross member being displaced with respect to the one hollow enclosure post.

2. The collision protector according to claim 1, wherein the signalling element comprises a spring-loaded element suitable for moving the foldable part from a rest position to an unfolded position, wherein the foldable part, in the rest position, bears against a wall of the at least one hollow cross member.

3. The collision protector according to claim 1, wherein the securing part is provided with a layer of adhesive for attaching the signalling element.

4. The collision protector according to claim 3, wherein the layer of adhesive may be covered by a removable protective layer.

5. A skirting board assembly configured to be fitted onto a floor structure and suitable for delimiting a zone or protecting walls against impact, the skirting board assembly comprising:

at least two hollow plastic skirting profiles, an installer to install adjacent skirting profiles of the at least two hollow plastic skirting profiles to each other, and a signalling element, wherein the installer comprises a first connecting element and a second connecting element, wherein the first connecting element comprises a first insertion part which is configured to be fitted in an end of a first skirting profile of the at least two hollow plastic skirting profiles, wherein the second connecting element comprises a second insertion part which is configured to be fitted in an end of a second skirting profile of the at least two hollow plastic skirting profiles, wherein the first skirting profile and the second skirting profile are adjacent to each other, wherein the signalling element (i) is provided with a securing part in order to be secured to the installer, and (ii) comprises a foldable part of a predetermined length, and wherein the signalling element is configured to fold open when a distance between one of the at least two hollow plastic skirting profiles and the installer becomes greater than the predetermined length due to the installer being displaced with respect to the one of the at least two hollow plastic skirting profiles.

* * * * *